(12) United States Patent
Johansson et al.

(10) Patent No.: US 7,320,755 B2
(45) Date of Patent: *Jan. 22, 2008

(54) METHOD OF PREPARING LIGANDS FOR HYDROPHOBIC INTERACTION CHROMATOGRAPHY

(75) Inventors: Bo-Lennart Johansson, Uppsala (SE); Jean-Luc Maloisel, Uppsala (SE); Nicolas Thevenin, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 314 days.

This patent is subject to a terminal disclaimer.

(21) Appl. No.: 10/547,570
(22) PCT Filed: Mar. 5, 2004
(86) PCT No.: PCT/SE2004/000316

§ 371 (c)(1),
(2), (4) Date: Aug. 29, 2005

(87) PCT Pub. No.: WO2004/078311

PCT Pub. Date: Sep. 16, 2004

(65) Prior Publication Data

US 2006/0175258 A1 Aug. 10, 2006

(30) Foreign Application Priority Data

Mar. 5, 2003 (SE) .................................. 0300612

(51) Int. Cl.
*B01D 15/08* (2006.01)
(52) U.S. Cl. .................. 210/635; 210/656; 210/198.2; 210/502.1; 502/401; 502/439
(58) Field of Classification Search ............... 210/635, 210/656, 659, 679, 198.2, 502.1; 502/401, 502/402, 439
See application file for complete search history.

(56) References Cited

U.S. PATENT DOCUMENTS

| 4,837,348 | A | 6/1989 | Stolowitz et al. |
| 5,945,520 | A * | 8/1999 | Burton et al. .................. 536/20 |
| 7,005,071 | B2 * | 2/2006 | Andersson et al. ......... 210/635 |
| 7,067,059 | B2 * | 6/2006 | Maloisel et al. ............ 210/635 |

(Continued)

FOREIGN PATENT DOCUMENTS

| WO | WO 02/053288 | * | 7/2002 |
| WO | WO 03/024588 | | 3/2003 |

OTHER PUBLICATIONS

Feist, P., et al., "Sulfhydrylcellulose: A New Medium for Chromatography of Mercurated Polynucleotides", *Biochemistry*, vol. 20, No. 15, 1981, p. 4243-4246.

*Primary Examiner*—Ernest G. Therkorn
(74) *Attorney, Agent, or Firm*—Yonggang Ji

(57) ABSTRACT

The invention is a method of preparing multimodal ligands for hydrophobic interaction chromatography (HIC), which comprises providing a cyclic scaffold comprising a thiol, an amine and a carbonyl group; derivatisation of the nitrogen with a reagent to introduce a primary interaction; and aminolysis of the resulting derivative, whereby a secondary interaction is introduced next to the carbonyl; wherein at least one of the primary interaction and the secondary interaction comprises a hydrophobic group and wherein non of said interactions comprises charged groups, i.e. ion exchange ligands. The invention also encompasses a separation medium comprising such multimodal ligands immobilised to a base matrix.

10 Claims, 9 Drawing Sheets

U.S. PATENT DOCUMENTS

2004/0168983 A1* 9/2004 Andersson et al. ......... 210/656
2004/0238446 A1* 12/2004 Maloisel et al. ............ 210/656
2005/0175237 A1* 8/2005 Young ....................... 382/164
2006/0027501 A1* 2/2006 Andersson et al. ......... 210/656
2006/0175258 A1* 8/2006 Johansson et al. .......... 210/656
2006/0188931 A1* 8/2006 Maloisel et al. ............. 435/7.1

* cited by examiner

METHOD OF PREPARING LIGANDS FOR HYDROPHOBIC INTERACTION CHROMATOGRAPHY

CROSS REFERENCE TO RELATED APPLICATIONS

This application is a filing under 35 U.S.C. 371 and claims priority to international patent application number PCT/SE2004/000316 filed Mar. 5, 2004, published on Sep. 16, 2004 as WO 2004/078311 and also claims priority to patent application number 0300612-9 filed in Sweden on Mar. 5, 2003; the disclosures of which are incorporated herein by reference in their entireties.

TECHNICAL FIELD

The present invention relates to a method of preparing ligands and a medium for separation based on hydrophobic interactions between a target and the ligands, such as hydrophobic interaction chromatography (HIC). The invention also embraces separation media comprising such ligands as well as use thereof to isolate molecules, such as proteins and peptides.

BACKGROUND

The term chromatography embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions (partitions) many times before the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in the order of increasing interaction with the stationary phase. The least retarded component elutes first, the most strongly retained material elutes last. Separation is obtained when one component is retarded sufficiently to prevent overlap with the zone of an adjacent solute as sample components elute from the column.

One kind of chromatography which has become of increased interest for separation of proteins is hydrophobic interaction chromatography (HIC), which is based on difference in surface hydrophobicity. Proteins and peptides usually sequester hydrophobic amino acids in domains away from the surface of the molecule, but still usually have sufficient hydrophobic groups exposed to allow interaction with hydrophobic ligands attached to a stationary phase. An advantage of HIC is that elution conditions are mild, which is preserves biological activity. One kind of available HIC media is based on aromatic interaction mode, such as Phenyl Sepharose™ (Amersham Biosciences, Uppsala, Sweden). Such aromatic derivatised media can e.g. be prepared by immobilisation on an agarose base matrix of phenyl glycidyl ether under Lewis acid catalysis.

Another kind of available HIC media is based on aliphatic interaction mode, such as Butyl Sepharose™ (Amersham Biosciences, Uppsala, Sweden). Such aliphatic ligands can e.g. as well be prepared in a similar fashion as described above, but this time with the use of aliphatic glycidyl ether.

Another specific chromatographic method, which utilises hydrophobic interactions but often with a much more hydrophobic base matrix than the conventional HIC, is reverse phase chromatography (RPC). In RPC, the base matrices are also more flow resistant than in conventional HIC, which allows higher flow rates during separation. Elution in RPC is performed by use of an organic solvent. RPC media are also commercially available, e.g Source™ media (Amersham Biosciences, Uppsala, Sweden).

With the development of recombinant DNA technologies, proteins have become of increased interest and consequently the need of efficient methods for purification thereof has increased. Up to know, ion exchange has been the most prevalent chromatography method for protein purification. However, proteins are complex molecules that could provide a plurality of possible interaction with a stationary phase. There are however no available general separation media that utilises both the hydrophobicity of a protein and other interactions simultaneously. Accordingly, there is a need in this field of HIC media that are supplemented with groups that provides one or more additional interaction modes. Consequently, there is also a need of efficient methods for preparing such multimodal media for use in HIC and RPC.

Finally, Feist and Danna ("Sulfhydryl cellulose: A New Medium for Chromatography of Mercurated Polynucleotides". Patricia L. Feist and Kathleen J. Danna, Biochemistry, 20(15), p. 4243-4246) have disclosed a process of preparing sulfhydryl cellulose, which process includes to mix amino ethyl cellulose with an N-acetylhomocysteine thiolactone. The concentration of active sulfhydryl groups is determined by reacting the sulfhydryl cellulose with Ellmans reagent.

SUMMARY OF THE PRESENT INVENTION

One object of the present invention is to provide a method of preparing ligands for hydrophobic interaction chromatography, which method is a simple and robust two step synthesis. A specific object is to provide such a method, which allows introduction of multiple functionalities on each ligand.

Another object of the invention is to provide a method as mentioned above, which provides well-defined ligands.

A further object of the invention is to provide a method as mentioned above, which can be immobilised to the desired degree of substitution on a solid support.

One or more of the objects above can be achieved as described in the appended claims. Other objects and advantages of the present invention will appear from the detailed description that follows.

DEFINITIONS

Figure 1:
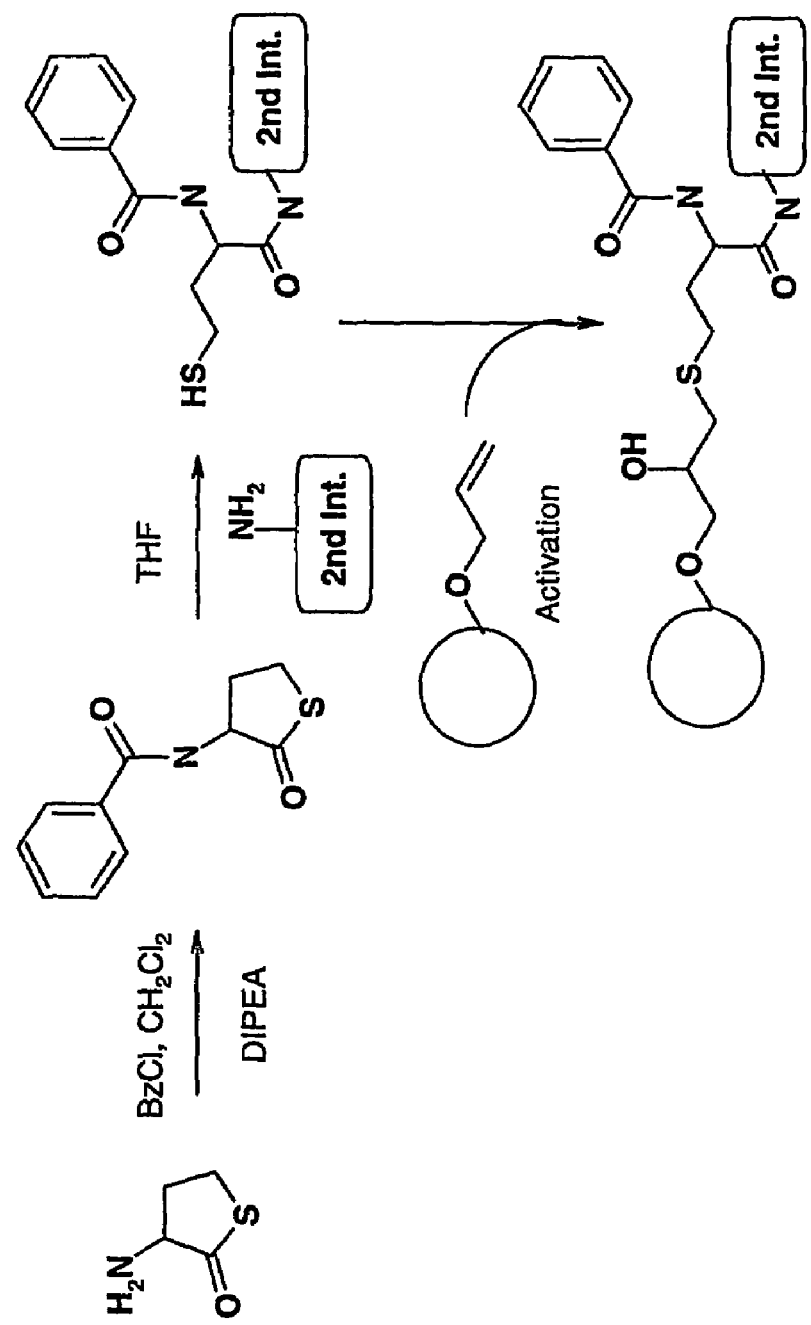
FIG. 1 provides by Scheme 1 an illustration of how a diverse library of multimodal HIC/RPC media can be prepared according to the invention and using homocysteine thiolactone as a scaffold.

The term "separation medium" is used herein for a material useful e.g. as packing of a chromatography column, and more specifically consists of one or more ligands coupled to a base matrix. Thus, the base matrix acts as a carrier, while the ligands provide functionalities that interact with target substances in chromatography.

The term "spacer" is used for a chemical entity that distances a ligand from the base matrix.

The term "ligand" means herein a chemical entity capable of binding target substances. Such target substances may be either a compound, which it is desired to isolate or remove by chromatography, or alternatively an analytical target substance.

The term "ion exchange ligands" means groups that are charged during the adsorption phase of chromatography.

The terms "mixed mode ligand" and "multimodal ligand", in the context of this invention, refer to a ligand that is capable of providing at least two different, but co-operative, sites which interact with the substance to be bound. One of these sites gives hydrophobic interaction between the ligand and the substance of interest. The second site typically gives electron acceptor-donor interaction and/or hydrophobic and/or hydrophilic interactions. Electron donor-acceptor interactions include interactions such as hydrogen-bonding, π-π, charge transfer, dipole-dipole, induced dipole etc.

"Electron donor-acceptor interactions" mean that an electronegative atom with a free pair of electrons acts as a donor and bind to an electron-deficient atom that acts as an acceptor for the electron pair of the donor. (See e.g. Karger et al., An Introduction into Separation Science, John Wiley & Sons (1973) page 42.)

Typical acceptor atoms/groups are electron deficient atoms or groups, such as metal ions, cyano, nitrogen in nitro etc, and include a hydrogen bound to an electronegative atom such as —OH in hydroxy, and carboxy, —NH— in amides and amines, HS— in thiol etc.

DETAILED DESCRIPTION OF THE INVENTION

In a first aspect, the present invention is a method of preparing at least one multimodal ligand for hydrophobic interaction chromatography (HIC), which method comprises the steps of (a) providing at least one scaffold defined by the general formula (I)

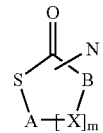

wherein A, B and X irrespective of each other are carbon atoms or any heteroatoms, such as oxygen, sulphur, nitrogen and/or silica, m is any integer between 0 and 4, such as 1-3, preferably 1 or 2, and the functional group N is a nitrogen, which either replaces one X or is attached to any one of A, B and X;

(b) derivatisation of the nitrogen of the scaffold(s) with a reagent comprising a reactive group Z coupled to a residue R to introduce a primary interaction; and (c) aminolysis of the resulting derivative to open up the cyclic structure between the carbonyl and the thiol, whereby a secondary interaction is introduced next to the carbonyl;

wherein at least one of the primary interaction and the secondary interaction comprises a hydrophobic group and wherein non of said interactions comprises ion-exchange ligands. In this context, ion-exchange ligands also includes groups that under the conditions used in chromatography are transformed into charged species. Hence, the ligand prepared according to the present method does not allow ionic interaction with target compounds via said first and second interactions. It is also understood that said first and second interactions are groups capable of interaction with the same target molecule.

Consequently, the present method is based on the use of three-functional scaffold presenting multiple advantages. It allows the selective introduction in turn of different interactions and the regeneration in the last step at the same time as the introduction of some extra interactions, of a thiol group for further immobilisation on a solid support. Given the high nucleophilicity of the thiol group, the immobilisation of the multimodal ligand via this group insures a homogenous media with a level of substitution that can be easily controlled and analysed. These specific characteristics allow a much shorter, much more efficient and cost-effective preparation of multimodal HIC media, which should otherwise be prepared via multiple steps of protection and deprotection of the functional groups.

In the most advantageous embodiment, in formula (I), A, B, and X are carbon atoms, and m is 1. However, as the skilled person in this field will easily understand, m can alternatively be an integer above 4, such as 5-500, e.g. 10-250 or more specifically 50-100, depending on the desired size of the ligands. Further, N can be attached to the cyclic structure via a linker, such as conventionally used in separation media, which linker may comprise linear, branched, cyclic saturated, unsaturated and aromatic hydrocarbon groups, e.g. with up to 1-20, such as 1-10 carbon atoms.

In a specific embodiment, in formula (I), the scaffold is homocysteine thiolactone. As the skilled person in this field will appreciate, homocysteine thiolactone can be used in an optically pure or racemate form. Homocysteine thiolactone is commercially available, e.g. from Aldrich, catalogue no. H1, 580-2, and CAS no. 6038-19-3.

In a specific embodiment, the reagent used in step (b) to provide the primary interaction is defined by the general formula (II)

$$-Z-R-\quad\quad\quad (II)$$

wherein

Z is a group which is capable of reacting with the nitrogen of the scaffold; and R is a group that provides the first interaction and can be a linear, branched, cyclic saturated, unsaturated and aromatic hydrocarbon group, which preferably comprises about 1-20, such as 1-10 carbon atoms.

More specifically, the Z group can comprise any electrophilic, and can be illustrated by C=C; C—Y, wherein Y represents for example a halogen, such as Br, I, Cl, or a mesylate, or a tosylate group; or an acid or an activated acid such as WC=O or $WSO_2$ wherein W is for example formed from a halogen atom, N-hydroxysuccinimide, pentafluorophenol, para-nitrophenol or isopropyl chloroformate.

Thus, the R group provides the first interaction. In one embodiment, R provides a hydrophobic group, such as an aromatic or an aliphatic group. In an alternative embodiment, if the second interaction provides one or more hydrophobic groups, then R provides any other group, which is non-charged under the adsorption conditions used, that provides an additional interaction with a target compound, such as electron acceptor-donor interaction, hydrogen bonds etc. For example, R can carry hydroxy groups, halogens, alkoxy and aryloxy and the corresponding thio analogues, and/or amino groups. Carbon chains may at one or more positions be interrupted by heteroatoms for certain applications, ether oxygen, thioether sulphur etc. There may also be carbonyl groups, such as in amides and ketones, and other groups having the comparable stability against hydrolysis. R can contain practically any groups, as long as the final separation medium exhibits a fill interval window where it is globally hydrophobic and can function in hydrophobic interaction chromatography. As the skilled reader will realise, the present method can use R groups comprised of two or more parts that are functional in binding. Thus, in a specific embodiment, R provides two functional groups $L_1$ and $L_2$ that enable primary interaction.

In one embodiment of the present method, step (b) is alkylation, acylation or sulfonylation. In an advantageous embodiment, step (b) comprises an acylation or a sulfonylation; a combination of alkylation and acylation; or combination of alkylation and sulfonylation. Hence, two different kinds of interaction can be introduced in this step.

In order to provide the second interaction, step (c) above, which is a ring opening by aminolysis, is performed by adding any suitable amine that carries a secondary interaction, i.e. one or more functionalities capable of interacting with a target compound. Thus, in step (c), a reagent is added, which is comprised of two parts: one amine part and one part that provides one or more functional groups that enable the desired interactions. The secondary interaction can be any one of the ones discussed above in the context of the primary interaction, with the one proviso that at least one of said interactions provides hydrophobic interaction and that none of them are charged groups under the adsorption conditions used.

In a specific embodiment, the amine added is defined by the general formula II:

Formula 2 wherein $L_3$ and $L_4$ comprise functionalities, which can be the same or different.

In an advantageous embodiment, the present invention also comprises a step (d), wherein the thiol of the product obtained from step (c) is reacted with a base matrix comprising a reactive group. Thus, the product of this embodiment is a separation medium for HIC, wherein a plurality of multimodal ligands are immobilised to a suitable base matrix.

The base matrix of step (d) is commonly in beaded or monolithic form. The base matrix can e.g. be in the form of a gel, preferably a porous gel, or porous beads. In alternative embodiments, the base matrix can e.g. be a membrane, a filter, one or more chips, surfaces, capillaries etc In a first embodiment of the present method, the base matrix of step (d) is made from a natural polymer. Suitable porous polymer beads of natural polymers are either easily performed by the skilled person in this field according to standard methods, such as inverse suspension gelation (S Hjertén: Biochim Biophys Acta 79(2), 393-398 (1964) or spinning disk technique (see e.g. WO 88/07414 (Prometic Biosciences Inc)) or obtained from commercial sources, such as Amersham Biosciences AB, Uppsala, Sweden. Illustrative tradenames of such useful natural polymer beads are e.g. of the kind known as Sepharose™ or Sephadex™.

In an advantageous embodiment, which is especially suitable for conventional HIC, wherein the elution is provided by decreasing the salt concentration, the base matrix is agarose. In a specific embodiment, ligands are immobilised to a particulate base matrix to a substitution level of about 10-50, such as about 20, μmol/ml base matrix to provide a HIC medium.

In a second embodiment of the present method, the base matrix of step (d) is made from a synthetic polymer, preferably a cross-linked synthetic polymer, such as styrene or styrene derivatives, divinylbenzene, acrylamides, acrylate esters, methacrylate esters, vinyl esters, vinyl amides etc. Such polymers are easily produced according to standard methods, see e.g. "Styrene based polymer supports developed by suspension polymerization" (R Arshady: Chimica e L'Industria 70(9), 70-75 (1988)). Alternatively, a commercially available product, such as Source™ (Amersham Biosciences AB, Uppsala, Sweden) can be surface-modified according to the invention.

In an advantageous embodiment, which is especially suitable for reverse phase chromatography (RPC), the base matrix is made from a highly hydrophobic material, such as divinylbenzene and/or styrene. In a specific embodiment, ligands are immobilised to a particulate base matrix to a substitution level of about 10-200, such as about 20-100, e.g. about 40, μmol/ml base matrix to provide an RPC medium.

In one embodiment, the reactive groups of the base matrix are allyl groups i.e. carbon-carbon double bonds. Thus, in one embodiment, the thiol group is coupled to allyl groups of the base matrix.

In one embodiment, a commercially available base matrix, which already exhibits allyl groups is used.

In an alternative embodiment, the allyl groups are provided according to well known methods. Thus, in one embodiment, the method also comprises a step of allylation of a base matrix to provide reactive groups. The method can also comprise a step of activating the reactive groups of the base matrix, e.g. by bromination. As a specific example the thiol group of the ligand is coupled to the base matrix via the allyl group of allyl glycidyl ether (AGE). (For a general review of immobilisation techniques, see e.g. see e.g. Immobilized Affinity Ligand Techniques, Hermanson et al, Greg T. Hermanson, A. Krishna Mallia and Paul K. Smith, Academic Press, INC, 1992.)

In a specific embodiment, in the present method, steps (a) and (b) have been performed earlier to provide a ready-derivatised scaffold. Accordingly, the present invention also encompasses a method, wherein the derivatisation of the scaffold has been performed earlier i.e. separate from the aminolysis and immobilisation to a base matrix of step (c) and (d), respectively.

In a second aspect, the present invention is the use of homocysteine thiolactone in the preparation of a separation medium for hydrophobic interaction chromatography comprising a plurality of multimodal ligands. Details suitable for this aspect are e.g. as disclosed above in the context of the method.

In a third aspect, the invention is a kit for preparing a separation medium for hydrophobic interaction chromatography comprising a plurality of multimodal ligands, which kit comprises homocysteine thiolactone, one or more derivatisation agents and one or more amines in separate compartments as well as written instructions for its use. In an alternative embodiment, the present kit comprises already derivatised homocysteine lactone and one or more amines in separate compartments as well as written instructions for its use.

In a fourth aspect, the present invention is a ligand, which is multimodal in the sense that it comprises at least one hydrophobic group and at least one further group, which both allows for interaction with a single target molecule in hydrophobic interaction chromatography (HIC). Details regarding the interacting groups are e.g. as described above in the context of the present method. In a specific embodiment, the present ligand has been prepared using the method according to the invention and described above.

In a fifth aspect, the present invention relates to a separation medium comprising a plurality of ligands immobilised to a base matrix, wherein each ligand comprises at least one hydrophobic group and at least one further group, which both allows for interaction with a single target molecule in hydrophobic interaction chromatography (HIC). Details is regarding the base matrix as well as the immobilisation of ligands thereon are e.g. as described above in the context of the present method. In a specific embodiment, the present ligand has been prepared using the method according to the invention and described above.

The separation medium according to the invention is suitable for use either in conventional hydrophobic interaction chromatography (HIC) or in the specific kind of hydrophobic interaction chromatography known as reverse phase chromatography (RPC), as discussed above. A great advantage of the present separation medium is that it comprises more than one functionality that can interact with a target, which is a novel feature within the field of HIC. By providing such multiple functionalities, an improved adsorption can be obtained, and its nature can be selected as desired depending on the choice of first and second interaction(s).

Thus, the present method allows an expedient preparation of multimodal HIC media, which to our knowledge has not been proposed before. Furthermore, the generality of the method provides easy access to the generation of libraries of multimodal HIC media.

These libraries allow the possibility to screen for specific chromatographic characteristic. The present invention also encompasses such a library.

Finally, the present invention also encompasses a chromatography column packed with a medium according to the invention. The column can be of any material and size, such as for large-scale production or lab-scale, or suitable for analytical purpose. In a specific embodiment, the column according to the invention is provided with luer adaptors, tubing connectors, and domed nuts. Also encompassed is a kit comprising a chromatography column; a separation medium comprising the herein described multimodal ligands; and optionally liquids; in separate compartments together with instructions that describes use of the kit for isolation of biomolecules.

In addition, the invention also relates to a process of separating a target substance from a liquid, which process comprises to provide a separation medium which comprises a plurality of ligands immobilised to a base matrix, wherein each ligand comprises at least one hydrophobic group and at least one further group, which both allows for interaction with a single target molecule in hydrophobic interaction chromatography (HIC), and to contact said medium with the liquid and to allow adsorption of the target substance to the ligands. In an advantageous embodiment, the process also comprises a step of eluting the target substance from the separation medium by adding a liquid that desorbs the target compound from the separation medium. The target substances are e.g. biomolecules, such as proteins, peptides, antibodies, virus, nucleic acids, such as DNA or RNA, plasmids etc. The general principles of chromatography, such as HIC and RPC, for separating a target substance as discussed above are well-known in this field, and the skilled person in this field can easily adopt the necessary parameters for use of the present process.

DETAILED DESCRIPTION OF THE DRAWINGS

FIG. 1 provides by Scheme 1 an illustration of how a diverse library of multimodal HIC/RPC media can be prepared according to the invention and using homocysteine thiolactone as a scaffold. The multimodal HIC ligand is efficiently prepared in two synthetic steps. The HIC interaction is herein first introduced by benzoylation of the scaffold. The extra interactions can then conveniently be introduced by the opening of the ring structure be any suitable amine(s). The multimodal HIC ligands so obtained will all contain a thiol group, which can subsequently be used to immobilise the ligand to an activated base matrix under conventional conditions.

Figure 2:
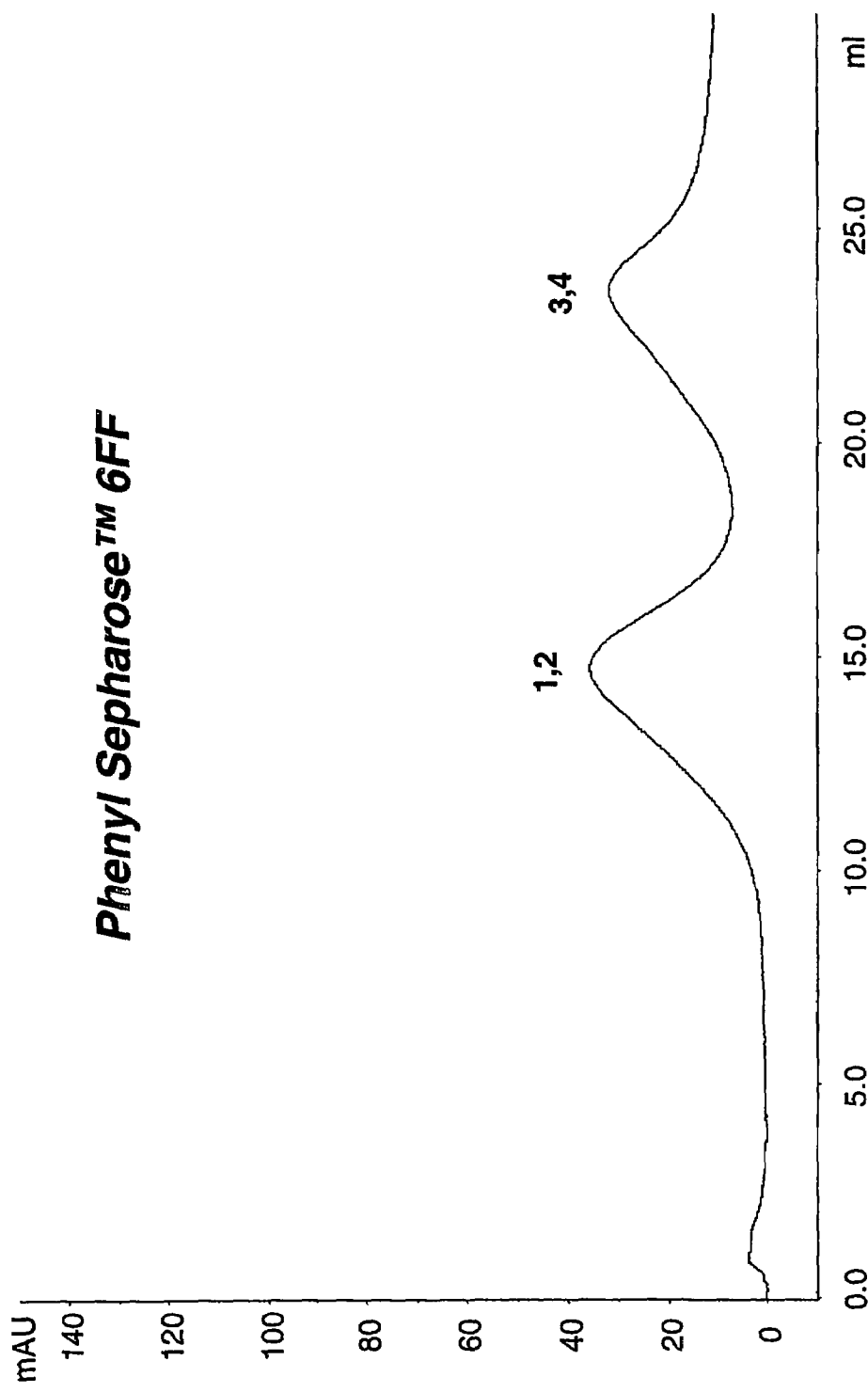
FIG. 2 shows a comparative elution profile of four proteins (myoglobine (1), ribonuclease A (2), alpha-lactalbumine (3), and alpha-chymotrypsine (4)) on the prior art separation medium Phenyl Sepharose™ 6FF (Amersham Biosciences, Uppsala, Sweden), as described below.

FIG. 2 shows a comparative elution profile of four proteins (myoglobine (1), ribonuclease A (2), alpha-lactalbumine (3), and alpha-chymotrypsine (4)) on the prior art separation medium Phenyl Sepharose™ 6FF (Amersham Biosciences, Uppsala, Sweden), as described below.

Figure 3:
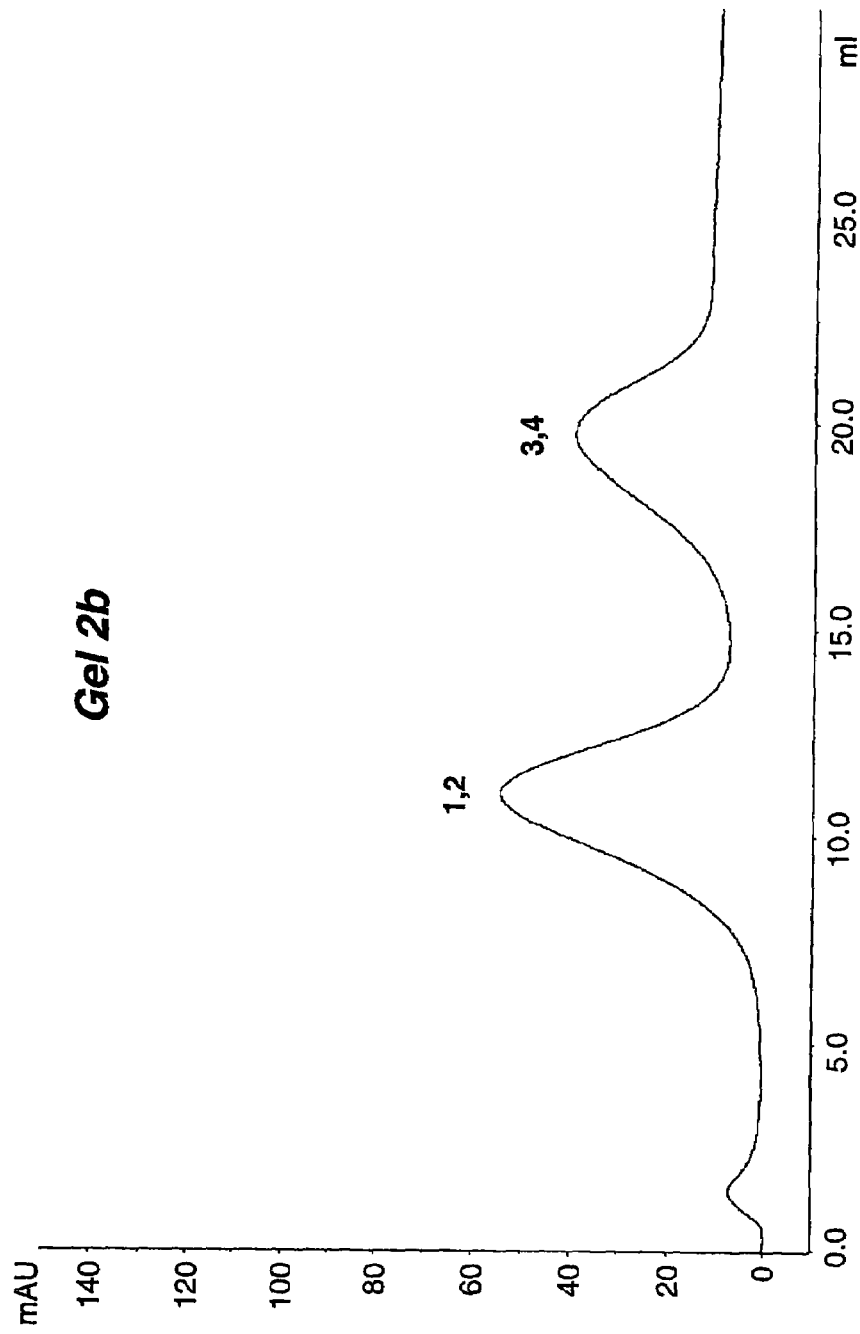
FIG. 3 shows the elution profile of four proteins (as defined under FIG. 2) on Gel 2 according to the invention, as described below.

FIG. 3 shows the elution profile of four proteins (as defined under FIG. 2) on Gel 2 according to the invention, as described below.

Figure 4:
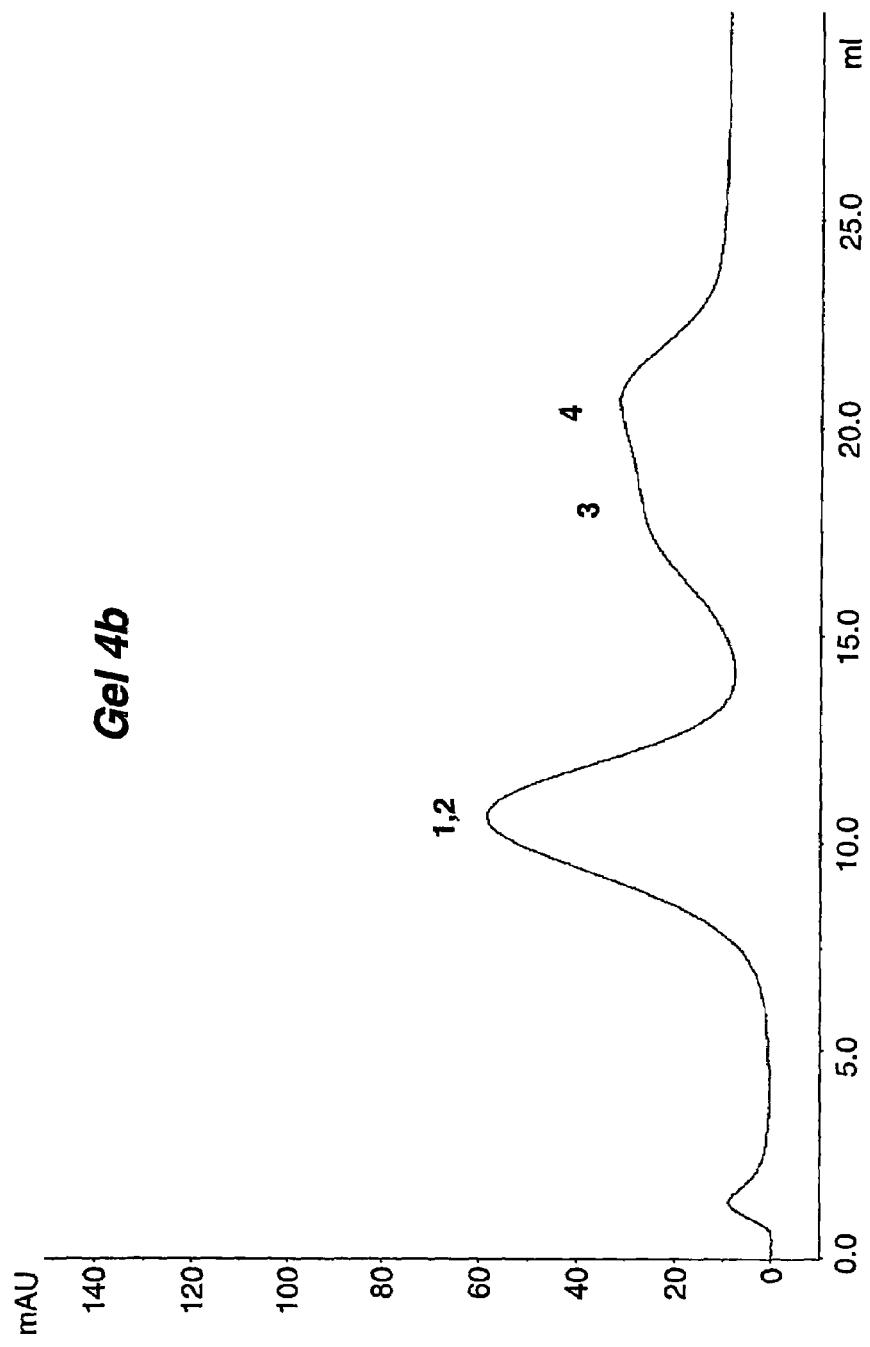
FIG. 4 shows the elution profile of four proteins (as defined under FIG. 2) on Gel 4b according to the invention, as described below.

FIG. 4 shows the elution profile of four proteins (as defined under FIG. 2) on Gel 4b according to the invention, as described below.

Figure 5:
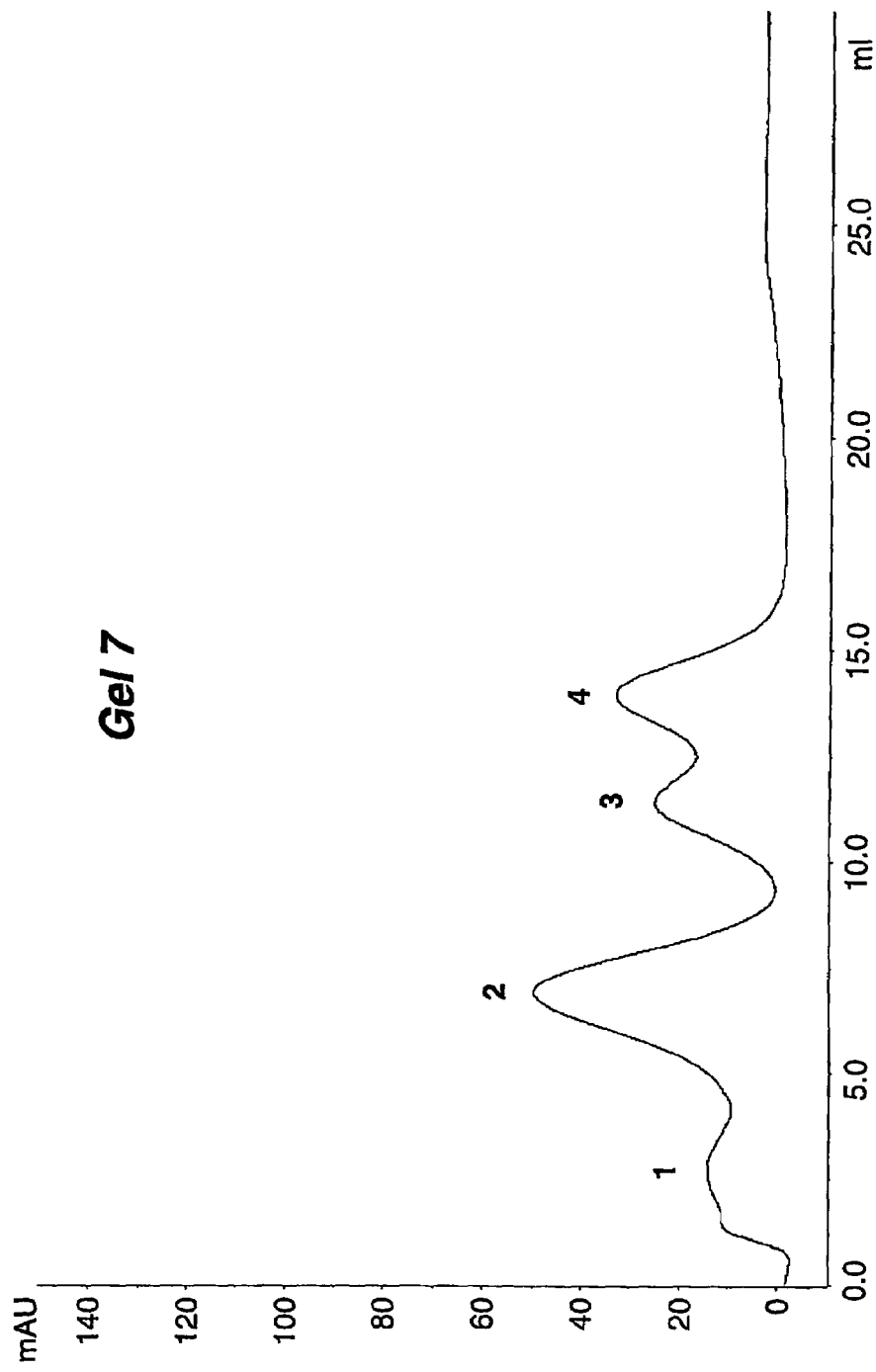
FIG. 5 shows the elution profile of four proteins (as defined under FIG. 2) on Gel 7 according to the invention, as described below.

FIG. 5 shows the elution profile of four proteins (as defined under FIG. 2) on Gel 7 according to the invention, as described below.

Figure 6:
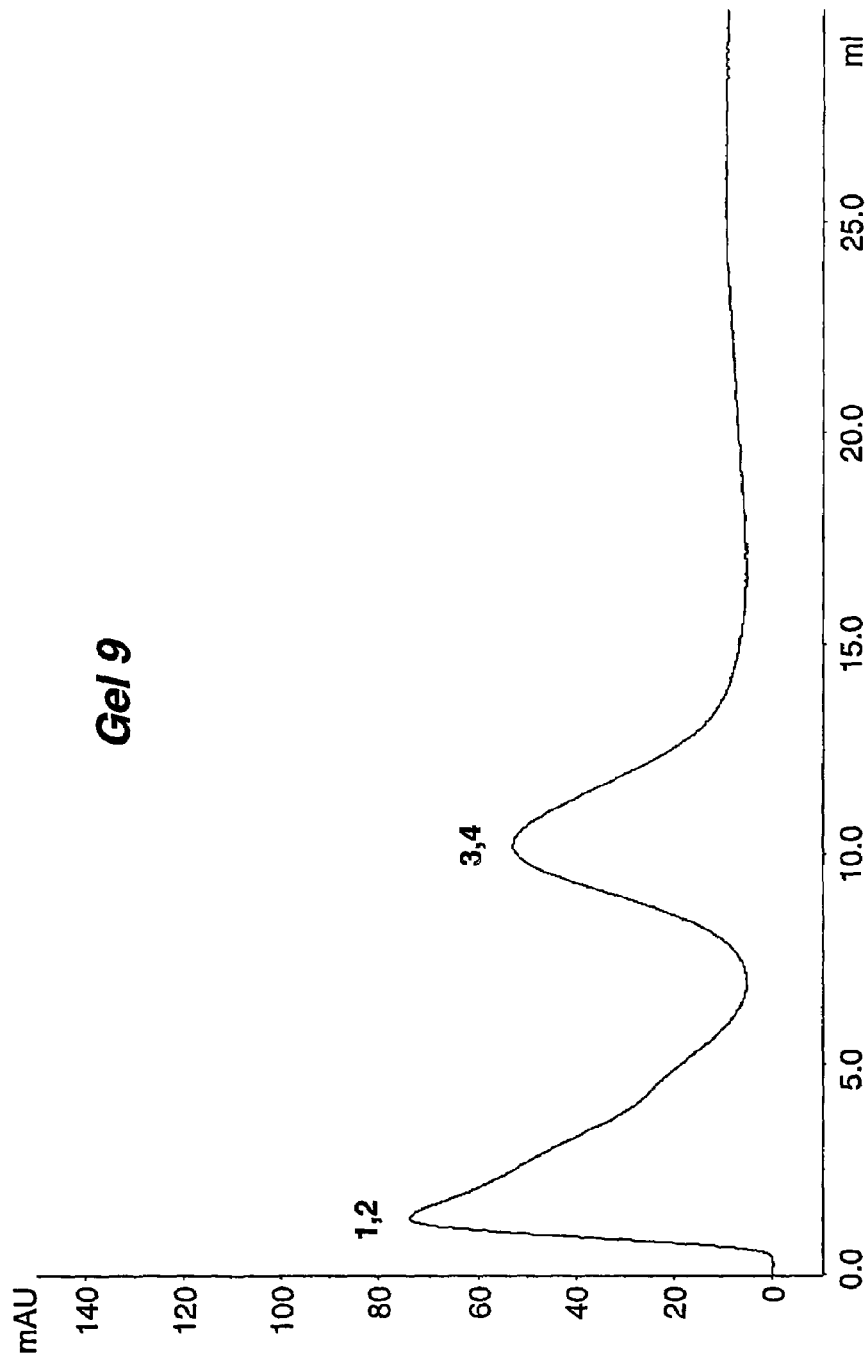
FIG. 6 shows the elution profile of four proteins (as defined under FIG. 2) on Gel 9 according to the invention, as described below.

FIG. 6 shows the elution profile of four proteins (as defined under FIG. 2) on Gel 9 according to the invention, as described below.

Figure 7:
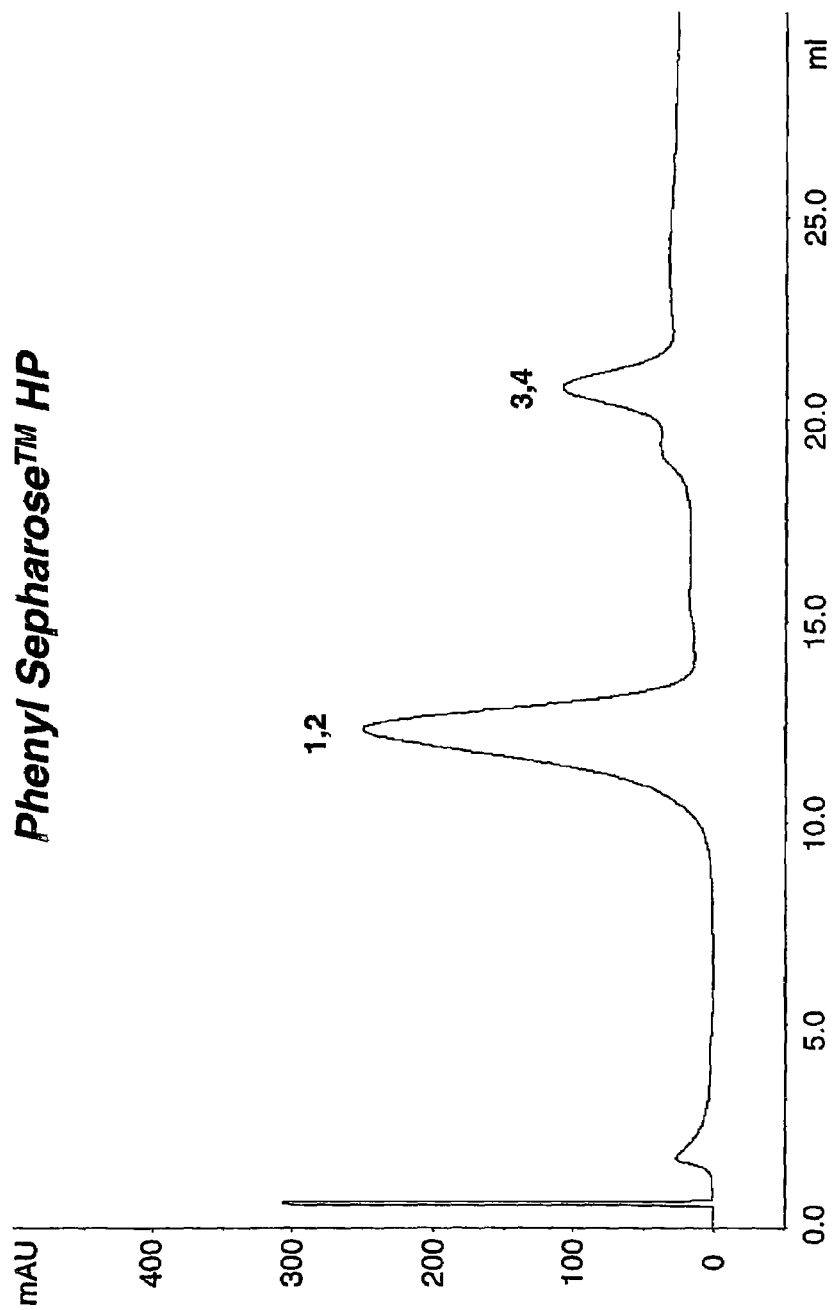
FIG. 7 shows a comparative elution profile of four proteins (as defined under FIG. 2) on the prior art separation medium Phenyl Sepharose™ HP (Amersham Biosciences, Uppsala, Sweden), as described below.

FIG. 7 shows a comparative elution profile of four proteins (as defined under FIG. 2) on the prior art separation medium Phenyl Sepharose™ HP (Amersham Biosciences, Uppsala, Sweden), as described below.

Figure 8:
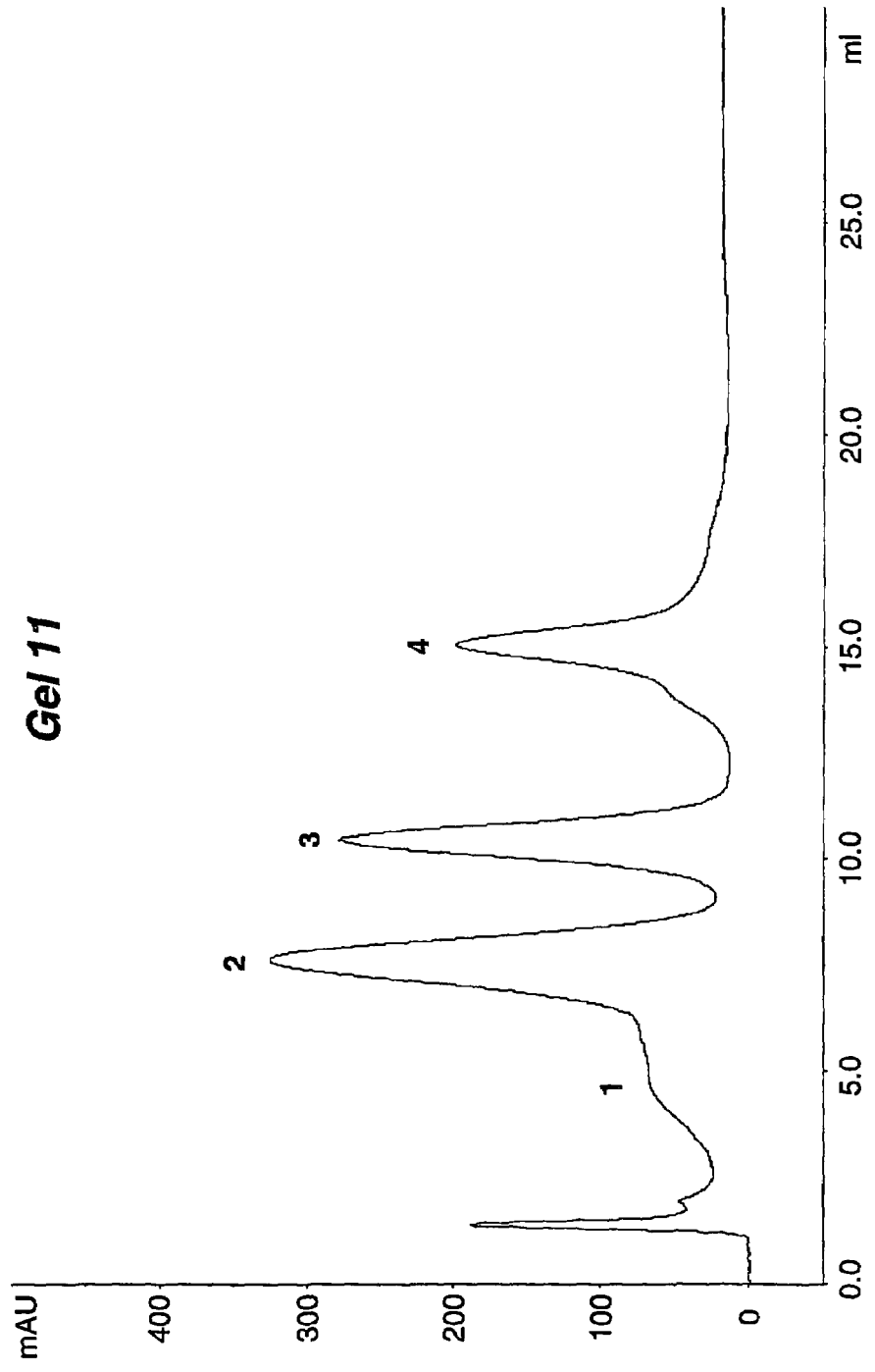
FIG. 8 shows the elution profile of four proteins (as defined under FIG. 2) on Gel 11 according to the invention, as described below.

FIG. 8 shows the elution profile of four proteins (as defined under FIG. 2) on Gel 11 according to the invention, as described below.

More specifically, FIGS. 2 to 8 show an illustrative comparison of the elution profiles of four proteins (ribonuclease, myoglobine, alpha-chymotrypsine and alphalactalbumine) using prior art separation media (high sub Phenyl Sepharose™ 6 Fast Flow and Phenyl Sepharose™ High Performance, Amersham Biosciences, Uppsala, Sweden) (above) and a multimodal HIC medium prepared according to the present invention (below). The samples were applied on the columns under identical conditions and elution was performed in all cases with a linear gradient of decreasing salt concentration. The elution profile obtained with the conventional phenyl derived HIC media show only two peaks, while some of the multimodal ligands prepared according to the present invention from the thiolactone scaffold, the peaks corresponding to each one of the four proteins are clearly separated.

Figure 9:
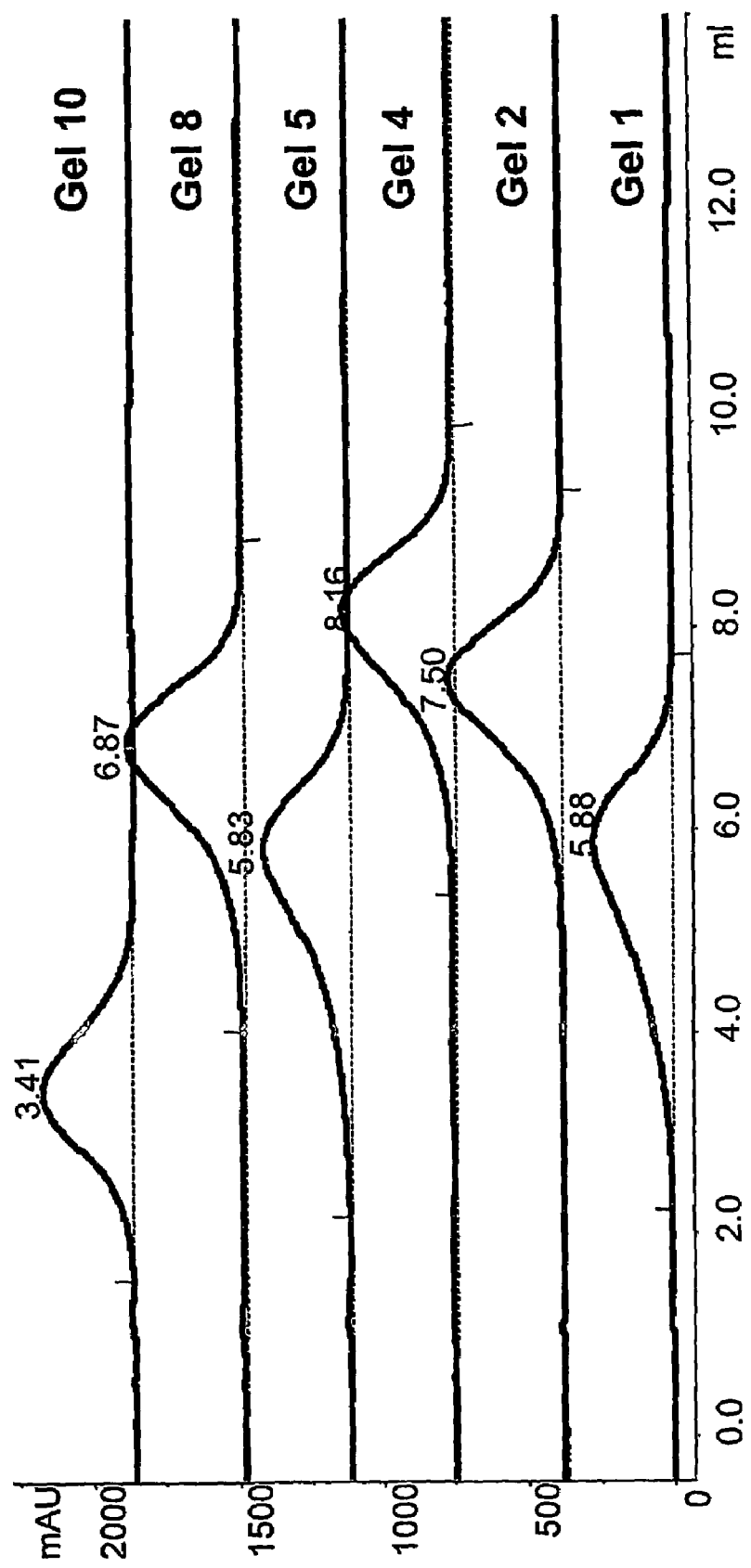
FIG. 9 shows the difference of elution profiles obtained with different multimodal media, and illustrates the influence of the second interactions in RPC mode.

FIG. 9 shows the difference of elution profiles obtained with different multimodal media, namely Gels 1,2,4,5,8,10. In this series of media, the primary hydrophobic interaction was first introduced by an aromatic substituent (see also Scheme 1) and the other interactions were then obtained by reacting this intermediate in a parallel fashion respectively with diethylene glycolamine (Gel 10), furfurylamine (Gel 8), 3-(Aminoethyl) pyridine (Gel 5), thiophene-2-methylamine (Gel 4a), butylamine (Gel 2a), benzylamine (Gel 1). Deoxycortycosterone was applied on all columns under identical conditions and elution was performed in all cases with a linear gradient of increasing amount of organic solvent. The differences observed in the elution of deoxycortycosterone clearly emphasise the influence of the second interactions in RPC mode.

EXPERIMENTAL PART

The present examples are provided for illustrative purposes only, and should not be construed as limiting the invention as defined by the appended claims. All references given below and elsewhere in the present specification are hereby included herein by reference.

General Procedure Using D,L-homocysteine Thiolactone to Generate New Media

Scheme 2: General synthetic scheme

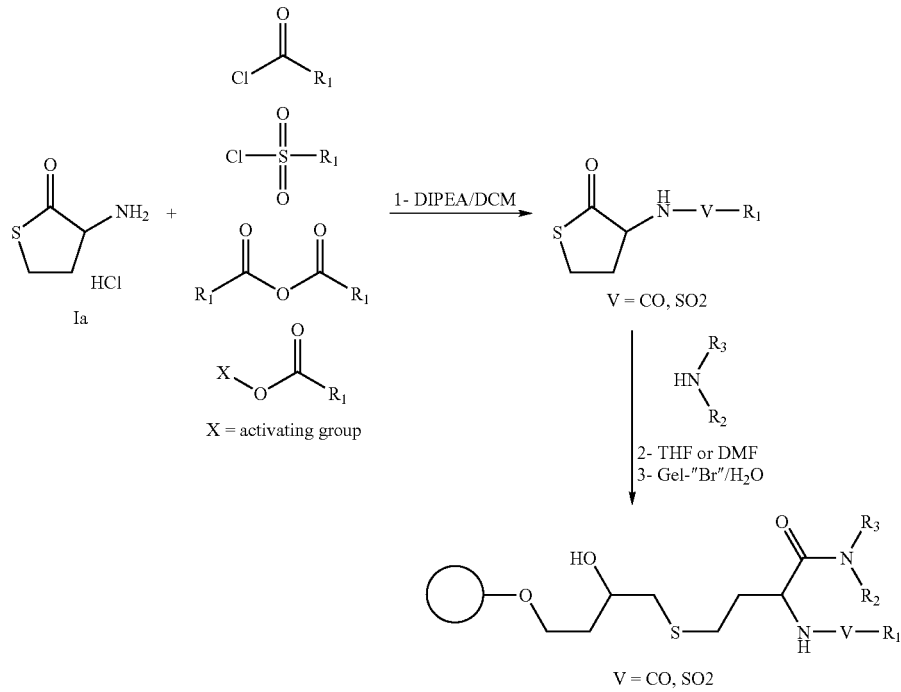

General Procedure

Step 1:

A solution A of DL-homocysteine thiolactone Ia and di-isopropylamine (DIPEA) in dichloromethane (DCM) was cooled down to 0° C. A solution B containing an acyl chloride or a sulfonyl chloride or an anhydride or an activated acid in DCM was cooled down to 0° C., and added drop wise to the solution A maintained between 0 and 5° C. The mixture was stirred overnight at room temperature. The solvent was removed under vacuum. If necessary the resulting product can be dissolved in ethyl acetate and washed with citric acid (10% in water w/w) solution and by potassium carbonate (10% in water w/w) solution. The organic phase was washed with water before being dried with sodium sulphate and the solvent evaporated.

Step 2:

The resulting product was dissolved in tetrahydrofuran (THF) and degassed by bubbling nitrogen for 10 min. To this solution an amine dissolved in THF was added at room temperature. The reaction mixture was stirred for another 17 hours. After the solvent has been evaporated under vacuum, ethyl acetate and citric acid (10% in water w/w) solution were mixed. The organic phase was washed with water before being dried with sodium sulphate and the solvent evaporated.

When it was necessary, the product was purified by HPLC before step 3.

Step 3:

Brominated Sepharose™ 6 Fast Flow obtained following a well-known procedure was mixed with an alkaline solution of the product issued from step 2 and warmed up to 50° C. overnight. After reaction, the gel (1 volume) was filtered and washed with water (2×15 vol.), ethanol (2×15 vol.), acetic acid 0.2M (2×15 vol.) and water (2×15 vol.). loading of ligand on the gel was measured by elementary analysis of Sulphur.

The structure and the loading of ligands are summarised in table 1 below.

EXAMPLES 1-10

Generation of Separation Media According to the Invention Using Different $R_1$, $R_2$ and $R_3$ Groups The following examples are using D,L homocysteine thiolactone Ia as a scaffold and the described chemistry (cf. Scheme 1 above). After formation of the amide or the sulphonamide bound by reacting homocysteine thiolactone Ia with acyl chlorides, sulfonyl chlorides, anhydrides or activated acids, the opening of the thiolactone ring is realised with an amine and the resulting compound further coupled to an activated Sepharose™ 6 Fast Flow or an activated Sepharose™ High Performance.

In Table 1 the results from the gels using Sepharose™ 6 Fast Flow with an allyl loading of 66 µmol/ml are indicated by a) while the results from allyl loading of 31 µmol/ml are indicated with b). The results from the gels using Sepharose™ High Performance with an allyl loading of 115 µmol/ml are indicated with c).

Example 1

Step 1: 11.5 g (75.0 mmol) of DL-homocysteine thiolactone hydrochloride was dissolved in 120 ml of DCM and 16.1 ml (150.0 mmol) of DIPEA. To this solution, 8.7 ml (75.0 mmol) of benzoyl chloride in 30 ml DCM were added slowly at room temperature according to Step 1. The solvent was removed under vacuum and ethyl acetate (300 ml) was added. The organic phase was washed with citric acid (10% in water w/w) solution and by potassium carbonate (10% in water w/w) solution (2×100 ml). The organic phase was dried with sodium sulphate before evaporation and 13.8 g of a white powder recovered. Yield: 83%.

Step 2: 220 mg (0.98 mmol) of product issued from Step 1 was dissolved in 7 ml of THP. To this degassed solution (10 min bubbling of nitrogen), 0.533 ml (4.9 mmol) of benzylamine were added and the mixture stirred at room temperature for 16 h. The solvent removed, ethyl acetate (10 ml) was added to the crude material. Citric acid (10% in water w/w) solution (2×5 ml) was used to extract the excess of amine. The organic phase was dried over sodium sulphate before the solvent was removed under vacuum. A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 1 was then washed with THF, dimethylformamide (DMF), ethanol, water, acetic acid 0.2M.

Elementary analysis on dried gel: % S: 1.38 (calc. ligand concentration: 29.1 µmol/ml).

Example 2a

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.482 ml (4.9 mmol) of n-butylamine were added and the mixture stirred at room temperature for 16 h. The solvent removed, ethyl acetate (10 ml) was added to the crude material. Citric acid (10% in water w/w) solution (2×5 ml) was used to extract the excess of amine. The organic phase was dried over sodium sulphate before the solvent was removed under vacuum. A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 2a was then washed with THF, dimethylformamide (DMF), ethanol, water, acetic acid 0.2M.

Elementary analysis on dried gel: % S: 2.4 (calc. ligand concentration: 53.7 µmol/ml).

Example 2b

Step 1: same procedure as described in Example 1-Step 1.

Step 2: 82.3 mg (0.37 mmol) of product issued from Step 1 was dissolved in 5 ml of THF. To this degassed solution (10 min bubbling of nitrogen), 0.184 ml (1.86 mmol) of n-butylamine were added and the mixture stirred at room temperature for 16 h. The solvent removed, ethyl acetate (10 ml) was added to the crude material. Citric acid (10% in water w/w) solution (2×5 ml) was used to extract the excess of amine. The organic phase was dried over sodium sulphate before the solvent was removed under vacuum. A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 31 µmol/ml of gel were activated using bromine and added to the ligand. The reaction mixture was shaken overnight at 50° C. The gel 2b was then washed with THF, dimethylformamide (DMF), ethanol, water, acetic acid 0.2M.

Elementary analysis on dried gel: % S: 1.47 (calc. ligand concentration: 24.8 µmol/ml).

Example 3

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.646 ml (4.9 mmol) of n-hexylamine were added and the mixture stirred at room temperature for 16 h. The solvent removed, ethyl acetate (10 ml) was added to the crude material. Citric acid (10% in water w/w) solution (2×5 ml) was used to extract the excess of amine. The organic phase was dried over sodium sulphate before the solvent was removed under vacuum. A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose 6 Fast Flow with a loading of 65 µmol/ml of gel were activated using bromine and added to the ligand. The reaction mixture was shaken overnight at 50° C. The gel 3 was then washed with THF, dimethylformamide (DMF), ethanol, water, acetic acid 0.2M.

Elementary analysis on dried gel: % S: 1.77 (calc. ligand concentration: 41.2 µmol/ml).

Example 4a

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.500 ml (4.9 mmol) of 2-aminomethylthiophene were added and the mixture stirred at room temperature for 16 h. The solvent removed, ethyl acetate (10 ml) was added to the crude material. Citric acid (10% in water w/w) solution (2×5 ml) was used to extract the excess of amine. The organic phase was dried over sodium sulphate before the solvent was removed under vacuum. A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 4a was then washed with THF, dimethylformamide (DMF), ethanol, water, acetic acid 0.2M.

Elementary analysis on dried gel: % S: 4.4 (calc. ligand concentration: 57.0 µmol/ml).

Example 4b

Step 1: same procedure as described in Example 1-Step 1.

Step 2: 82.3 mg (0.37 mmol) of product issued from Step 1 was dissolved in 5 ml of THF. To this degassed solution (10 min bubbling of nitrogen), 0.191 ml (1.86 mmol) of 2-aminomethylthiophene were added and the mixture stirred at room temperature for 16 h. The solvent removed, ethyl acetate (10 ml) was added to the crude material. Citric acid (10% in water w/w) solution (2×5 ml) was used to extract the excess of amine. The organic phase was dried over sodium sulphate before the solvent was removed under vacuum. A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 31 µmol/ml of gel were activated using bromine and added to the ligand. The reaction mixture was shaken overnight at 50° C. The gel 4b was then washed with THF, dimethylformamide (DMF), ethanol, water, acetic acid 0.2M.

Elementary analysis on dried gel: % S: 1.87 (calc. ligand concentration: 18.3 µmol/ml).

Example 5

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.496 ml (4.9 mmol) of 3-(aminomethyl)pyridine were added and the mixture stirred at room temperature for 16 h. The solvent removed, ethyl acetate (10 ml) was added to the crude material. Citric acid 10% solution (2×5 ml) was used to extract the excess of amine. The organic phase was dried over sodium sulphate before the solvent was removed under vacuum. A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 5 was then washed with THF, dimethylformamide (DMF), ethanol, water, acetic acid 0.2M.

Elementary analysis on dried gel: % S: 2.1 (calc. ligand concentration: 61.6 µmol/ml).

Example 6

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.541 ml (4.9 mmol) of 1-methylpiperazine were added and the mixture stirred at room temperature for 16 h. The solvent removed, and the crude material was purified by reversed phase HPLC (Water/Acetonitrile). A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 6 was then washed with THF, dimethylformamide (DMF), ethanol, water, acetic acid 0.2M.

Elementary analysis on dried gel: % S: 2.2 (calc. ligand concentration: 46.1 µmol/ml).

Example 7

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.591 g (4.9 mmol) of tris(hydroxymethyl)aminomethane hydrochloride and 3.76 ml of DIPEA were added and the mixture stirred at room temperature for 16 h. The solvent removed, and the crude material was purified by reversed phase HPLC (Water/Acetonitrile). A colourless oil solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 7 was then washed with THF, dimethylformamide (DMF), ethanol, water, acetic acid 0.2M.

Elementary analysis on dried gel: % S: 1.30 (calc. ligand concentration: 21.9 µmol/ml).

Example 8

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.431 ml (4.9 mmol) of furfurylamine were added and the mixture stirred at room temperature for 16 h. The solvent removed, and the crude material was purified by reversed phase HPLC (Water/Acetonitrile). A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 8 was then washed with THF, dimethylformamide (DMF), ethanol, water, acetic acid 0.2M.

Elementary analysis on dried gel: % S: 2.65 (calc. ligand concentration: 55.3 µmol/ml).

Example 9

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.817 g (4.9 mmol) of GLY-GLY amide hydrochloride and 4.76 ml of DIPEA were added and the mixture stirred at room temperature for 16 h. The solvent removed, and the crude material was purified by reversed phase HPLC (Water/Acetonitrile). A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 9 was then washed with THF, dimethylformamide (DMF), ethanol, water, acetic acid 0.2M.

Elementary analysis on dried gel: % S: 0.97 (calc. ligand concentration: 17.1 µmol/ml).

Example 10

Step 1: same procedure as described in Example 1-Step 1.

Step 2: 220 mg (0.98 mmol) of product issued from Step 1 was dissolved in 7 ml of THF. To this degassed solution (10 min bubbling of nitrogen), 0.489 ml (4.9 mmol) of 2-(2aminoethoxy)ethanol were added and the mixture stirred at room temperature for 16 h. The solvent removed, and the crude material was purified by reversed phase HPLC (Water/Acetonitrile). A white solid was recovered and the purity estimated by LC-MS (>90%).

Step 3: product from Step 2 was dissolved in 5 ml THF. 1 ml of water and 2 ml of NaOH 50% were also added to the ligand solution.

6 ml of allylated Sepharose™ 6 Fast Flow with a loading of 65 µmol/ml of gel were activated using bromine and added to the ligand. The reaction mixture was shaken overnight at 50° C. The gel 10 was then washed with THF, dimethylformamide (DMF), ethanol, water, acetic acid 0.2M.

Elementary analysis on dried gel: % S: 1.96 (calc. ligand concentration: 42.8 µmol/ml).

Example 11

Step 1: 10.0 g (65.0 mmol) of DL-homocysteine thiolactone hydrochloride was dissolved in 120 ml of DCM and 23.9 ml (136 mmol) of DIPEA. To this solution, 7.7 ml (65.0 mmol) of valeryl chloride in 30 ml DCM were added slowly at room temperature according to Step 1. The solvent was removed under vacuum and ethyl acetate (400 ml) was added. The organic phase was washed with citric acid (10% in water w/w) solution and by potassium carbonate (10% in water w/w) solution (2×100 ml). The organic phase was dried with sodium sulphate before evaporation and 8.86 g of a white powder recovered. Yield: 68%.

Step 2: 2.0 g (9.9 mmol) of product issued from Step 1 was dissolved in 30 ml of dried DMF. To this degassed solution (10 min bubbling of nitrogen), 3.0 g (24.8 mmol) of tris(hydroxymethyl)aminomethane were added and the mixture stirred at 90° C. for 4 h. The solvent removed, a flash chromatography was realised starting with EtOAc/MeOH: 9/1 yielding 2.7 g of a white solid. Yield: 84%.

Step 3: 78.2 mg of product from Step 2 were dissolved in 2.5 ml of water and 2.5 ml of NaOH 50% and the solution stirred for 1 h at room temperature.

6 ml of allylated Sepharose™ High Performance with a loading of 115 µmol/ml of gel were activated using bromine and added to the ligand solution. The reaction mixture was shaken overnight at 50° C. The gel 11 was then washed successively with water, ethanol, acetic acid 0.2M and water.

Elementary analysis on dried gel gave the percentage of S. The calculated ligand concentration was defined in µmol/ml.

TABLE 1

| ID | STRUCTURE of ligands | % S | Calculated ligand concentration (μmol/ml) |
|---|---|---|---|
| Gel 1 | (structure: homocysteine derivative with N-benzyl amide and N-benzoyl group) | 1.38 | 29.1[a] |
| Gel 2a | (structure: homocysteine derivative with N-butyl amide and N-benzoyl group) | 2.40 | 53.7[a] |
| Gel 2b | (structure: homocysteine derivative with N-butyl amide and N-benzoyl group) | 1.47 | 24.8[b] |
| Gel 3 | (structure: homocysteine derivative with N-hexyl amide and N-benzoyl group) | 1.77 | 41.2[a] |
| Gel 4a | (structure: homocysteine derivative with N-(2-thienylmethyl) amide and N-benzoyl group) | 4.4 | 57.0[a] |

TABLE 1-continued
| ID | STRUCTURE of ligands | % S | Calculated ligand concentration (μmol/ml) |
|---|---|---|---|
| Gel 4b | 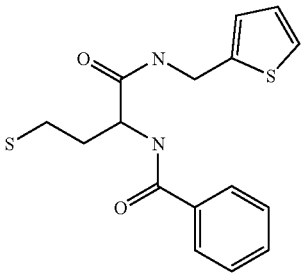 | 1.87 | 18.3[b] |
| Gel 5 | 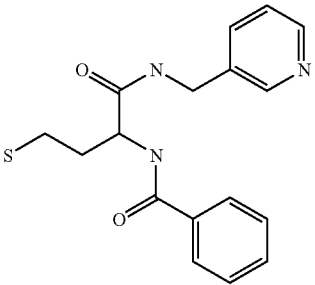 | 2.1 | 61.6[a] |
| Gel 6 | 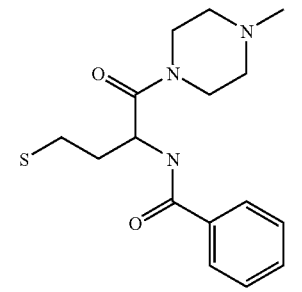 | 2.2 | 46.1[a] |
| Gel 7 | 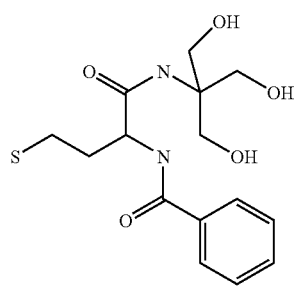 | 1.30 | 21.9[a] |
| Gel 8 | 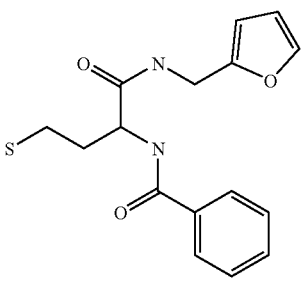 | 2.65 | 55.3[a] |

TABLE 1-continued

| ID | STRUCTURE of ligands | % S | Calculated ligand concentration (μmol/ml) |
|---|---|---|---|
| Gel 9 | [structure] | 0.97 | 17.1[a] |
| Gel 10 | [structure] | 1.96 | 42.8[a] |
| Gel 11 | [structure] | — | —[c] |

[a] matrix used is Sepharose ™ 6 Fast Flow with 65 μmol of allyl per ml of gel
[b] matrix used is Sepharose ™ 6 Fast Flow with 31 μmol of allyl per ml of gel
[c] matrix used is Sepharose ™ High performance with 115 μmol of allyl per ml of gel Experimental Reference Procedures for RPC Test Chromatography System:

All experiments were performed at room temperature using a ÄKTA™ Explorer 100 chromatography system (Amersham Biosciences AB) equipped with a Unicorn 3.1 software.

Test 1: Deoxycorticosterone
Injection volume: 10 μl (5mM Deoxycorticosterone in methanol)
Flow rate: __1.0 ml/min.
Eluent A: __10 mM Ammonium phosphate in MQ Milli-Q water, pH 7.
Eluent B: Acetonitrile
Elution: Linear gradient (0-80% B)
Gradient conditions: Column equilibration=10 column volumes (CV), gradient volume=20 CV and cleaning of column (after gradient) with 80% B=2 CV
Detection wavelength: 205, 236 and 280 nm Test 2: Peptide Separation The chromatographic evaluation was done by separating a mixture of 4 angiotensin derivatives at four different pH values, pH 2, 3, 7 and 12.

Angiotensin-I
Asp-Arg-Val-Tyr-Ile-His-Pro-Phe-His-Leu (Sigma A9650)

Angiotensin-III
Arg-Val-Tyr-Ile-His-Pro-Phe (ICN 191237)

Ile7-Angiotensin-III
Arg-Val-Tyr-Ile-His-Pro-Ile (Sigma A0911)

Val4Angiotensin-III
Arg-Val-Tyr-Val-His-Pro-Phe (Sigma A6277)

Injection volume: 10 μl (0.125 mg/ml) of each peptide in the sample mixture prepared in Milli-Q water)
Flow rate: __1.0 ml/min.
Eluent A: __0.1% TFA in MQ Milli-Q water (pH 2), 10 mM Potassium phosphate (pH 3 and 7)
Eluent B: Acetonitrile
Elution: Linear gradient (3-100% B)
Gradient condition: Column equilibration=5 column volumes (CV), gradient volume=10 CV and cleaning of column (after gradient) with 100% B=2 CV
Detection wavelength: 215 nm The column volume in this case is 2.49 ml (the method was developed for ST4.5/150 steel columns)

Experimental Reference Procedures for HIC Test 1 to 2 ml of gel in a 5/5 HR column from Amersham Biosciences AB running at 1 ml/min. The method involves use of A buffer of 2M (NH$_4$)$_2$SO$_4$+0.1M K Phosphate pH 7 plus another B buffer of 0.1M K Phosphate pH 7. The four proteins myoglobin 0.5 mg/ml, ribonuclease A (2 mg/ml), alpha-chymotrypsinogen A (0.8 mg/ml) and alphalactalbumin (0.5 mg/ml) are mixed in the A buffer and applied to the column. The column is then run with A buffer for 2 ml and then a gradient going from 100% of A to 100% of B in 20 ml is applied.

The chromatogram of reference gels Phenyl Sepharose™ 6 Fast Flow is showed in FIG. 2 and Phenyl Sepharose™ High Performance in FIG. 7.

The chromatograms of gels 2b, 4b, 7 and 9 made with a Sepharose™ 6 Fast Flow base matrix are presented in FIGS. 3, 4, 5 and 6 respectively. The four gels work under the tested HIC conditions described above and present different elution profiles.

The chromatogram of gel 11 made with a Sepharose™ High Performance base matrix is presented in FIG. 8. The gel works under the tested HIC conditions described above.

Legend for the Chromatograms:
1: Myoglobin
2: Ribonuclease A
3: α-lactalbumin
4: α-Chymotrypsin

What is claimed is:

1. A method of preparing at least one multimodal ligand for hydrophobic interaction chromatography (HIC), which method comprises the steps of
   (a) providing at least one scaffold defined by the general formula (I)

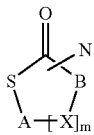
(I)

wherein A, B and X irrespective of each other are carbon atoms or any heteroatoms, m is any integer between 0 and 4, and the functional group N is a nitrogen, which either replaces one X or is attached to any one of A, B and X;
   (b) derivatisation of the nitrogen of the scaffold(s) with a reagent comprising a reactive group Z coupled to a residue R to introduce a primary interaction; and
   (c) aminolysis of the resulting derivative to open up the cyclic structure between the carbonyl and the thiol, whereby a secondary interaction is introduced next to the carbonyl;
wherein at least one of the primary interaction and the secondary interaction comprises a hydrophobic group and wherein non of said interactions comprises ion-exchange ligands.

2. The method of claim 1, wherein in formula (I), A, B, and X are carbon atoms, and m is 1.

3. The method of claim 2, wherein in formula (I), the scaffold is homocysteine thiolactone.

4. The method of claim 1, wherein the reagent used in step (b) is defined by the general formula (II)

wherein
Z is a group which is capable of reacting with the nitrogen of the scaffold; and R is a linear, branched, cyclic saturated, unsaturated and aromatic hydrocarbon group.

5. The method of claim 1, wherein step (b) is alkylation, acylation or sulfonylation.

6. The method of claim 5, wherein step (b) comprises an acylation or a sulfonylation; a combination of alkylation and acylation; or combination of alkylation and sulfonylation.

7. The method of claim 1, further comprising a step (d) of reacting the thiol of the product obtained from step (c) with a base matrix comprising a reactive group.

8. The method of claim 7, wherein the thiol group of the derivatised scaffold is coupled to allyl groups of the base matrix.

9. The method of claim 7, wherein the base matrix includes a polysaccharide and the separation medium is a HIC medium.

10. The method of claim 7, wherein the base matrix includes a synthetic polymer and the separation medium is an RPC medium.

* * * * *